(12) United States Patent
Smajic et al.

(10) Patent No.: US 12,260,172 B2
(45) Date of Patent: Mar. 25, 2025

(54) SYSTEM FOR FILELESS INFORMATION MANAGEMENT

(71) Applicant: SOURCE INC., Toronto (CA)

(72) Inventors: Adnan Smajic, Toronto (CA); David Patrick Turner, Toronto (CA); Alexandru Sebastian Gogan, Toronto (CA); John-Alan Maxwell Simmons, Toronto (CA)

(73) Assignee: SOURCE INC., Toronto (CA)

( * ) Notice: Subject to any disclaimer, the term of this patent is extended or adjusted under 35 U.S.C. 154(b) by 0 days.

(21) Appl. No.: 16/978,481

(22) PCT Filed: Mar. 4, 2019

(86) PCT No.: PCT/IB2019/051735
§ 371 (c)(1),
(2) Date: Sep. 4, 2020

(87) PCT Pub. No.: WO2019/171254
PCT Pub. Date: Sep. 12, 2019

(65) Prior Publication Data
US 2021/0110105 A1   Apr. 15, 2021

Related U.S. Application Data

(60) Provisional application No. 62/638,398, filed on Mar. 5, 2018.

(51) Int. Cl.
*G06F 3/0482* (2013.01)
*G06F 16/176* (2019.01)
(Continued)

(52) U.S. Cl.
CPC .......... *G06F 40/186* (2020.01); *G06F 3/0482* (2013.01); *G06F 16/176* (2019.01); *G06F 40/131* (2020.01)

(58) Field of Classification Search
CPC .... G06F 40/186; G06F 16/176; G06F 40/131; G06F 3/048–05
(Continued)

(56) References Cited

U.S. PATENT DOCUMENTS

| 6,055,543 | A  | * | 4/2000 | Christensen | ............ G06F 16/10 |
| 7,730,394 | B2 | * | 6/2010 | Davis | .................... G06F 40/166 |
| | | | | | 715/236 |

(Continued)

OTHER PUBLICATIONS

ISA/CA, International Search Report and Written Opinion, May 30, 2019, re PCT International Application No. PCT/IB2019/051735.
(Continued)

*Primary Examiner* — Daniel Rodriguez
(74) *Attorney, Agent, or Firm* — Perry + Currier

(57) ABSTRACT

Systems, devices, and methods for fileless information management are provided. A system includes a content-management server in communication with at least one client device via a computer network. The client device has a client user interface to concurrently display a content-editing area and a content card-management area. The content-management server stores content data and content card template metadata shareable between client devices. The content-management server stores programming instructions for a content card-management program for receiving, storing, and transmitting content data via content card templates. A content card template may include metadata associating content data stored in the memory with a content binding in the content-editing area of a client device.

28 Claims, 11 Drawing Sheets

(51) Int. Cl.
  *G06F 40/131* (2020.01)
  *G06F 40/186* (2020.01)
(58) Field of Classification Search
  USPC .......................................................... 715/272
  See application file for complete search history.

(56) References Cited

U.S. PATENT DOCUMENTS

| | | | | |
|---|---|---|---|---|
| 8,522,134 | B1* | 8/2013 | Zetlen | G06F 40/117 |
| | | | | 715/234 |
| 9,424,333 | B1* | 8/2016 | Bisignani | G06F 3/0482 |
| 9,715,506 | B2* | 7/2017 | Rosen | G06F 16/254 |
| 2006/0090173 | A1* | 4/2006 | Anderson | G06F 9/45537 |
| | | | | 719/328 |
| 2008/0222079 | A1* | 9/2008 | Abel | G06F 16/21 |
| 2010/0235806 | A1* | 9/2010 | Mohan | G06F 40/186 |
| | | | | 717/100 |
| 2012/0226658 | A1* | 9/2012 | Connor | G06F 16/93 |
| | | | | 707/E17.005 |
| 2012/0254730 | A1* | 10/2012 | Sunderland | G06F 40/186 |
| | | | | 715/234 |
| 2016/0124924 | A1* | 5/2016 | Greenberg | G06F 3/1415 |
| | | | | 715/738 |
| 2017/0220567 | A1* | 8/2017 | Masson | G06F 40/274 |
| 2018/0122139 | A1* | 5/2018 | Janzer | G06T 17/005 |

OTHER PUBLICATIONS

PCT/IB2019/051735, System for Fileless Information Management, Mar. 4, 2019.

* cited by examiner

SYSTEM FOR FILELESS INFORMATION MANAGEMENT

FIELD

The present disclosure relates generally to information management, and in particular, to information storage, synchronization, and distribution.

BACKGROUND

The majority of information produced by information workers is produced using productivity suites, which include productivity software programs such as word processors, spreadsheet processors, presentation editors, and image editors. Despite there being a multitude of different productivity suites available to information workers for creating a variety of different types of content, the content generated is generally stored and managed in the same way: with digital files.

SUMMARY

According to an aspect of the disclosure, a system for digital information management is provided. The system includes at least one client device having an associated graphical display surface and a client user interface to concurrently display a content-editing area and a content card-management area on the associated graphical display surface, a computer network, and a content-management server having a network interface in communication with at least one client device via the computer network, a memory for storing programming instructions and for storing content data and content card template metadata, and a processor in communication with the network interface and the memory, the processor configured to receive, store, and transmit content data via content card templates, wherein a content card template comprises metadata associating content data stored in the memory with a content binding in the content-editing area of the at least one client device.

The processor of the content-management server may be configured to receive and store content data by receiving a notification from a first client device that a first content card instance including the first portion of content was created in the content-editing area of the first client device, the first content card instance including in metadata a first content binding associated with the first portion of content, receiving the first portion of content routed through the first content binding, storing the first portion of content in the memory, and generating a first content card template associated with the first content card instance, the first content card template including metadata associating the first portion of content with the first content binding of the first content card instance.

The processor of the content-management server may be configured to transmit content data by receiving a notification from a second client device that a second content card instance was created in the content-editing area of the second client device, the second content card instance including a second content binding associated with the first content card template, and transmitting the first portion of content to the second client device routed through the second content binding for use as content in the second content card instance.

The processor of the content-management server may be further configured to update a content card template by receiving a notification from an editing client device that an edit has been made to the first portion of content in an editing content card instance in the content-editing area of the editing client device to generate an edited first portion of content, the editing content card instance including in metadata an editing content binding associated with the first content card template, receiving the edited first portion of content routed through the editing content binding, storing the edited first portion of content in the memory, and updating the metadata of the first content card template to associate the first content card template with the edited first portion of content.

The processor of the content-management server may further be configured to verify permission of the editing client device to edit the first portion of content prior to updating the metadata of the first content card template.

The processor of the content-management server may further be configured to designate the first portion of content as a first version of the first portion of content in the metadata of the first content card template prior to updating the metadata of the first content card template, and designate the edited first portion of content as a second version of the first portion of content in the metadata of the first content card template following updating the metadata of the first content card template.

The processor of the content-management server may further be configured to receive content data by receiving a notification from a requesting client device that a requesting content card instance was created in the content-editing area of the requesting client device, the requesting content card instance including in metadata a requesting content binding, generating a requesting content card template associated with the requesting content card instance, the requesting content card template including metadata associating the requesting content card template with the requesting content card instance, receiving a notification from a fulfilling client device that a fulfilling content card instance including fulfilling content was created in the content-editing area of the fulfilling client device, the fulfilling content card instance including in metadata a fulfilling content binding associated with the requesting content card template, receiving the fulfilling content routed through the fulfilling content binding, storing the fulfilling content in the memory, and transmitting the fulfilling content to the requesting client device routed through the requesting content binding for use as content in the requesting content card instance.

A scanning client device may be configured to, upon opening a document, scan the document for content card instances and to request to the content-management server that contains data of a content card instance in the document be updated according to an associated content card template.

The client user interface of a text-editing client device may include a word processor, and the first portion of content may include text.

The client user interface of a spreadsheet-editing client device may include a spreadsheet processor, and the first portion of content may include tabular numerical data.

The client user interface of a presentation-editing client device may include a presentation processor, and the first portion of content may include an image.

The first content card instance may include a nested content card instance of a parent content card instance.

The first portion of content may include a combination of at least two of text, tabular numerical data, and an image.

According to another aspect of the disclosure, a method for managing digital information is provided, involving maintaining content data and content card templates for the transmission of content data via content card instances.

The method may involve receiving a notification from a first client device that a first content card instance including a first portion of content was created in a content-editing area of the first client device, the first content card instance including in metadata a first content binding associated with the first portion of content, receiving the first portion of content routed through the first content binding, storing the first portion of content in a memory, and generating a first content card template associated with the first content card instance, the first content card template including metadata associating the first portion of content with the first content binding of the first content card instance.

The method may involve receiving a notification from a second client device that a second content card instance was created in the content-editing area of the second client device, the second content card instance including a second content binding associated with the first content card template, and transmitting the first portion of content to the second client device routed through the second content binding for use as content in the second content card instance.

The method may involve receiving a notification from an editing client device that an edit has been made to the first portion of content in an editing content card instance in the content-editing area of the editing client device to generate an edited first portion of content, the editing content card instance including in metadata an editing content binding associated with the first content card template, receiving the edited first portion of content routed through the editing content binding, storing the edited first portion of content in the memory, and updating the metadata of the first content card template to associate the first content card template with the edited first portion of content.

The method may involve verifying permission of the editing client device to edit the first portion of content prior to updating the metadata of the first content card template.

The method may involve designating the first portion of content as a first version of the first portion of content in the metadata of the first content card template prior to updating the metadata of the first content card template, and designating the edited first portion of content as a second version of the first portion of content in the metadata of the first content card template following updating the metadata of the first content card template.

The method may involve receiving a notification from a requesting client device that a requesting content card instance was created in the content-editing area of the requesting client device, the requesting content card instance including in metadata a requesting content binding, generating a requesting content card template associated with the requesting content card instance, the requesting content card template including metadata associating the requesting content card template with the requesting content card instance, receiving a notification from a fulfilling client device that a fulfilling content card instance including fulfilling content was created in the content-editing area of the fulfilling client device, the fulfilling content card instance including in metadata a fulfilling content binding associated with the requesting content card template, receiving the fulfilling content routed through the fulfilling content binding, storing the fulfilling content in a memory, and transmitting the fulfilling content to the requesting client device routed through the requesting content binding for use as content in the requesting content card instance.

Other features and advantages are described in greater detail below.

BRIEF DESCRIPTION OF THE DRAWINGS

Non-limiting embodiments of the present disclosure will now be described, by way of example only, with reference to the attached Figures, wherein.

DETAILED DESCRIPTION

Figure 1:
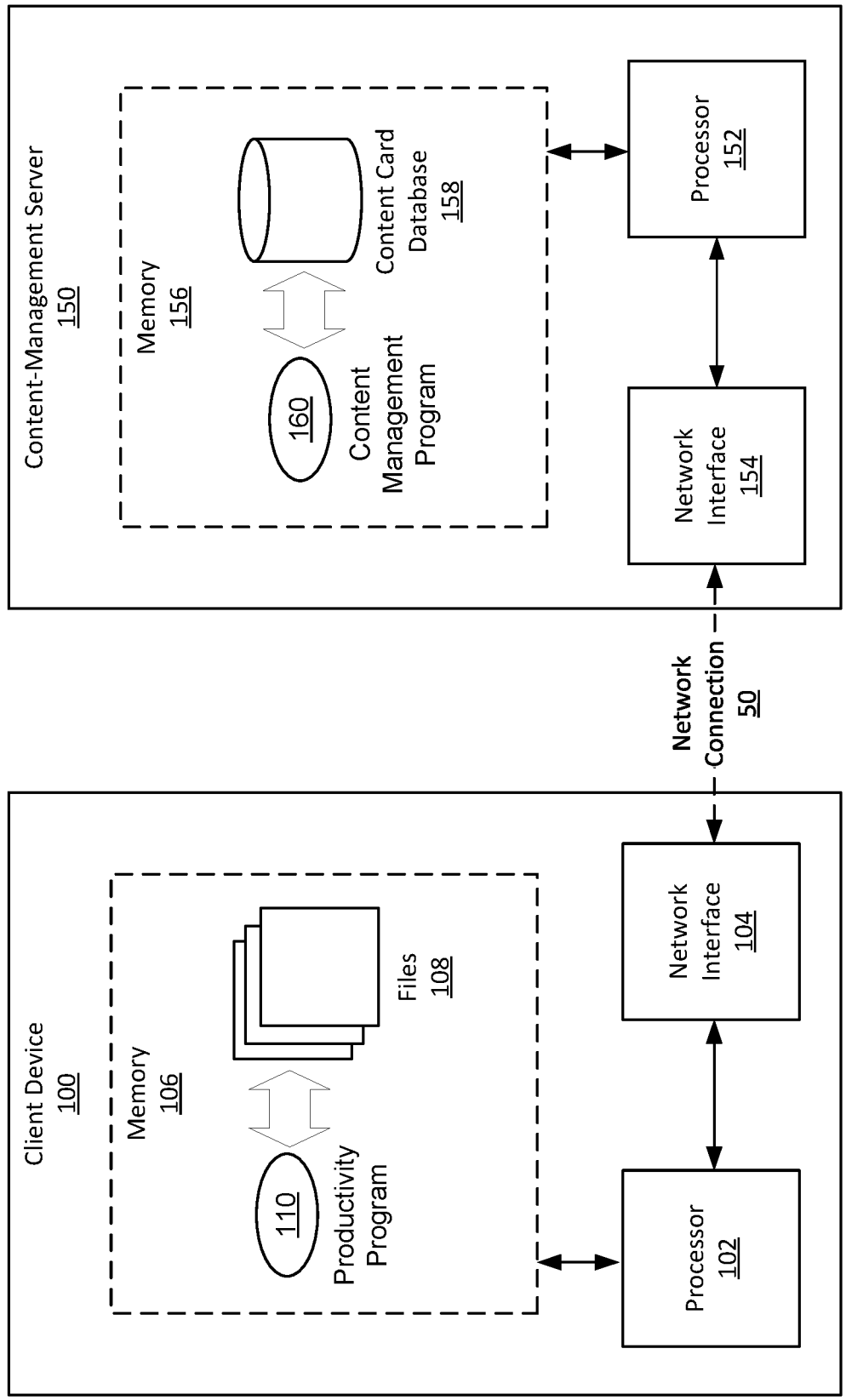
FIG. 1 is a schematic diagram of an example system for digital information management.

The storage of information in digital files is inherently problematic. Firstly, different productivity software will generally store information in proprietary file types. In proprietary file types, content, formatting, and metadata are generally bundled together in a manner rendering the content inaccessible to workers without particular productivity software configured to read and manipulate the bundle.

Second, sharing a specific set of information stored within a file generally entails searching through several files to find the set of information desired, extracting the information manually, and sending the information through a direct communications means such as a file transfer protocol or email. Alternatively, a worker may share an entire file containing the set of information desired, but the file will typically contain much more information than is desired by the recipient, causing an undue burden on information transmission networks and storage systems.

Third, the updating and versioning of content stored in files when a particular set of information in a file is updated are problematic because the versioning takes place at the file level. Updating a specific set of information stored within a file means creating a new version of the entire file, causing an undue burden on storage systems, and undue complexity in managing and distributing content updates.

Recent developments in file management such as cloud file storage systems go some way toward providing for smoother file sharing, but existing systems still store and share information in the form of files, and thus do not address the issues described above.

The present disclosure provides a system for digital information management which enables the fileless sharing of information. The system stores raw information content including text, numerical information, formatting information, image information, and other raw information which may otherwise be bundled into files, in a database stored on a content-management server. Uploading, downloading, sharing, editing, versioning, and security control of the raw information content is managed through the use of objects which may be termed content cards.

A content card includes two aspects: content card instances, which can appear as snippets of content in a document, on a webpage, or in another content-editing or content-displaying area, and content card templates, which are stored on a content-management server and which serve as mediators for uploading, downloading, sharing, editing versioning, and security control of content card instances.

A content card instance includes a content layer having raw text, numerical, or image content, a metadata layer having security metadata, formatting data, and content bindings which integrate with the document, webpage, or other content-editing or content-displaying area in which the content card instance is present, which enables data to be transmitted and received between the content card instance and the content-management server.

Generally, a content card instance will reflect an associated content card template, which points to content data, which includes raw content stored on the content-management server which should be included in the content card instance, along with metadata which enables compatibility between different productivity software. A content card instance inherits metadata, including permissions and formatting data, unless otherwise specified, from a content card template. Where an instance of a content card is edited in a document by a user, a new version of the content card can be created and associated with the content card template, and made available to other users. Where a user wishes to create a new document drawing from raw content stored on the content-management server, the user may select cards to pull into the document, allowing easy creation of new documents using the most up-to-date information. Editing and security control can be managed at the content card level.

Existing productivity software can be configured with a plugin enabling integration with the system. A word processor, for example, may include a toolbar dedicated to content card management, where existing content cards can be pulled into the document, and where new content cards can be created and uploaded to the system for sharing with other users.

Thus, instead of storing information in files, a user is able to store the information in smaller, more manageable snippets, through content cards, which can be independently shared, edited, updated, and controlled. Raw content can be created in one productivity software program, shared with another program, without compatibility issues, and without the burden of managing files. Raw content can, therefore, be consistently and congruently maintained across different productivity software and productivity suites.

Furthermore, the management of content data in more manageable quantities enables the application of several power analytical methods. For example, the system can identify content cards containing similar raw content and categorize the content cards accordingly. As another example, the system can recognize that when one content card is updated, and whether any related content cards may also require updating. For example, where a snippet of language in an important term in a standardized contract is updated in one content card instance in one document, notifications may be sent suggesting that similar terms in similar contracts in other documents should be similarly updated.

Other features and advantages of the system are described in greater detail below, with reference to the non-limiting embodiments described in the attached Figures. Although the following embodiments generally describe a system for digital information management in the context of document editing, it is to be understood that the example embodiments provided do not limit the scope of the present disclosure.

FIG. 1 is a schematic diagram of a system for digital information management, according to a non-limiting embodiment. The system includes a client device 100 and a content-management server 150 in communication over one or more computer networks, indicated as network connection 50. The client device 100 includes a computing device having storage, communication, and processing means, and is configured to run productivity software programs, as described further below. The content-management server 150 similarly includes a computing device having storage, communication, and processing means, and is configured to receive, store, and transmit content data via content card templates.

The network connection 50 can include a connection via the internet, a Wi-Fi network, a local-area network, a wide-area network (WAN), a wireless cellular data network, a virtual private network (VPN), a combination of such, and similar.

Client device 100 includes a processor 102, a graphical display surface 103, a network interface 104, and a memory 106, and may include several other computing components not shown for brevity, such as one or more input devices.

Although a single processor 102 is shown, the term "processor" as discussed herein refers to any quantity and combination of a processor, a central processing unit (CPU), a microprocessor, a microcontroller, a field-programmable gate array (FPGA), and similar.

The network interface includes programming logic enabling the client device 100 to communicate over network connection 50, is configured for bidirectional data communications through the network connection 50, and accordingly can include a network adaptor and driver suitable for the type of network used.

The memory 106 can include volatile storage and non-volatile storage. Volatile storage may include random-access memory (RAM) or similar. Non-volatile storage may include a hard drive, flash memory, and similar. The memory 106 stores programming instructions for executing a productivity program 110. A productivity program 110 can include any program with which a user may create or edit productive or creative content, such as a word processor, a spreadsheet processor, a presentation processor, a code editor, an image editor, animation software, and the like. Examples of word processors include Microsoft® Word and Google® Docs. Examples of spreadsheet processors include Microsoft® Excel and Google® Sheets. Examples of presentation processors include Microsoft® PowerPoint and Google® Slides. An example image editor includes Adobe® Illustrator.

The memory 106 further stores various files 108 as a means for storing information generated using the productivity program 110. The content data, which includes raw content and metadata such as formatting data, stored in the various files 108, may be stored in different file types, such as .docx, .xlsx, or .pptx, depending on the productivity program 110 used to generate a particular file 108. The storage of information in files effectively locks the information stored therein from access without the proper productivity program 110 designed to manipulate the file. However, the content-management server 150 provides infrastructure for sharing information without being restricted to files. For example, the content management program 160 may provide a platform for users to directly share information via content cards. In some examples, the productivity program 110 may include a plugin for integrating with the content-management program 160, and the transmission and receiving of data between the content-management server 150 via network connection 50, for the sharing of information.

In some embodiments, the client device 100 may include a smartphone running an operating system such as, for example, Android®, iOS®, Windows® mobile, or similar, or in other embodiments, a desktop computer, a tablet computer, a laptop, a desktop computer, or similar.

The content-management server 150 includes a processor 152, a network interface 154, and a memory 156, and may include several other computing components not shown for brevity, such as a display screen and one or more input devices. Although a single content-management server 150 is described, it is understood that content-management server 150 may refer to a combination of computers and/or servers, such as in a cloud computing environment.

For a description of processor 152, network interface 154, and memory 156, reference may be had to analogous components of client device 100. The memory 156, however, stores programming instructions for executing a content management program 160 for managing raw content and content cards. The content-management server 150 stores in memory 106 raw content which should be included in content card instance which may be present in any of the files 108, along with the metadata which enables compatibility between different productivity software programs. The content card database 158 stores content card templates and raw content data associated with content card templates. The content card database 158 can store raw content in any suitable format, such as in plain text, raw image formats, and markup languages such as XML, OOXML, and HTML, such that the information can be readily shared with users regardless of the productivity software program being used. By storing raw content in the content card database 158, and making the raw content shareable and editable through the use of content cards, as discussed below, the need to store documents in the form of files can be obviated. Further, content can be shared using content cards across different productivity programs 110 irrespective of the particular productivity program 110 used to generate a particular content card. For example, a first user may create content using a first productivity program 110 (e.g. draft a document using a word processor), generate a content card containing a portion of the content (e.g. text from the document), and upload the content card to the content-management server 150. A second user may access the content card from the content-management server 150 and use the content in the content card in a second productivity program 110 (e.g. include the text into an illustrator program). Thus, information may be shared between different users using different programs without regard to compatibility issues between different programs.

The content management program 160 may provide a platform on which users may access content card templates, generate content card templates, and manage or edit content card templates. A user may use the platform to configure a data model for how content is treated by the content card template. Content card templates accessible on the platform may be restricted in access to particular user accounts, and content card templates may be shareable between different user accounts. A user may interact with the platform through an application programming interface (API) or a graphical user interface hosted by the content-management server 150 or another server.

Although a single content card database 158 is shown, it is understood that content card database 158 may refer to a combination of databases, libraries, and data stores, and can be distributed across several devices, such as in a cloud computing environment. Further, the content card database 158 may comprise a relational database or a non-relational database.

In some examples, the content card database 158 may also be based on blockchain or distributed ledger technology that stores raw content card data on a distributed ledger. In such examples, the content-management server 150 may include a plurality of nodes which process transactions relating to content cards stored on the distributed ledger, such as the addition or editing of a content card. A content card database 158 based on blockchain or distributed ledger technology provides infrastructure for a decentralized database of content card data and an immutable and tamper-proof history of changes to the content card database 158. Further, the nodes may cooperate to store all or parts of the content cards, each independently validating and executing the required logic and permission policies.

Figure 2:
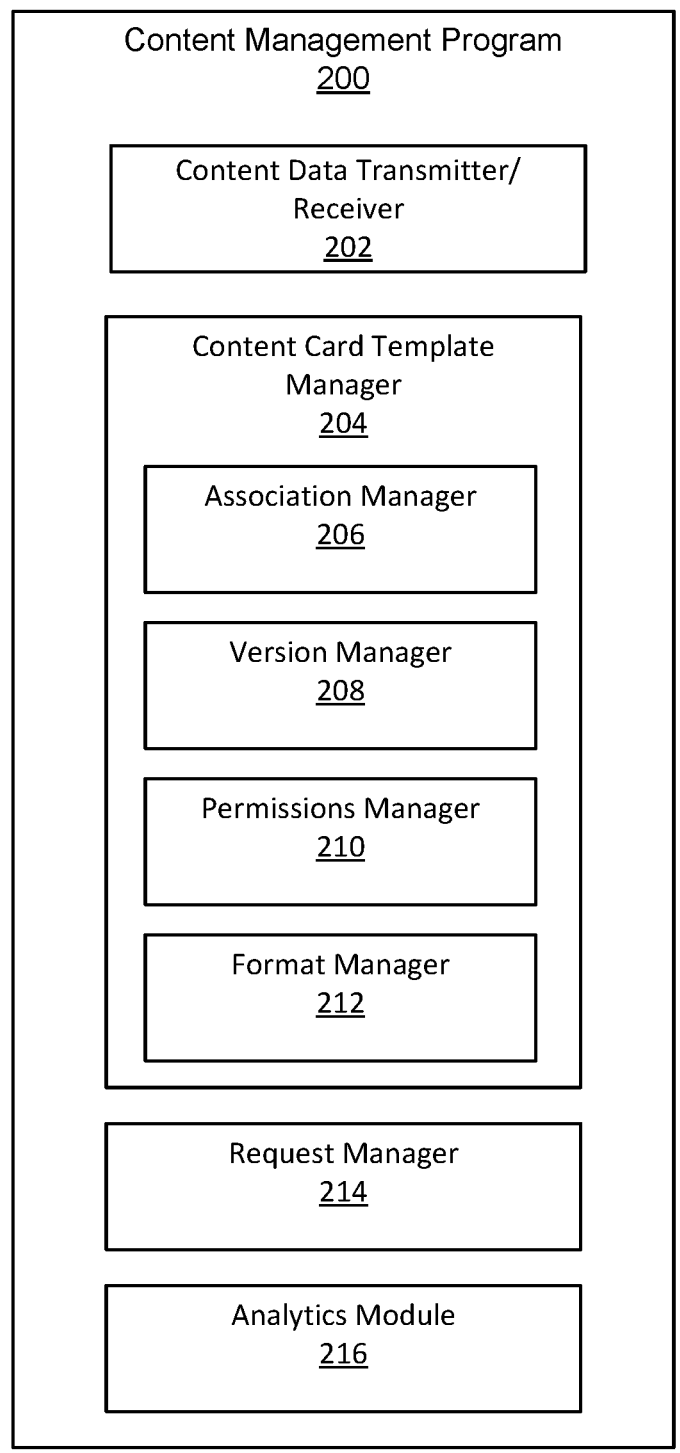
FIG. 2 is a block diagram showing the functional modules of an example content management application.

FIG. 2 is a block diagram showing the functional modules of a content management program 200, according to a non-limiting embodiment. The functional modules described herein include the programming instructions for executing the methods discussed throughout the Figures.

The content management program 200 includes a content data transmitter/receiver 202 for transmitting/receiving raw content and associated metadata to/from client devices. In some embodiments, the content data transmitter/receiver 202 communicates with a plugin integrated into a productivity software application.

The content management program 200 includes a content card template manager 204 for creating and modifying content card templates stored on the content-management server. The content card template manager 204 includes an association manager 206, which creates, deletes, and modifies associations of content card templates stored on the content-management server; a version manager 208 which creates new versions of content card templates; and a permissions manager 210 which manages user permissions to view, edit, share, or perform other tasks with content cards; and a format manager 212 for managing formatting metadata associated with content card templates so that raw content is viewable consistently across different platforms.

The content management program 200 includes a request manager 214 which sends requests for content and receives requests for content, from client devices and other third-party software for content stored on the content-management server.

The content management program 200 includes an analytics module 216, which can be used to analyze and gain insights from the content stored on the content-management server.

Figure 3:
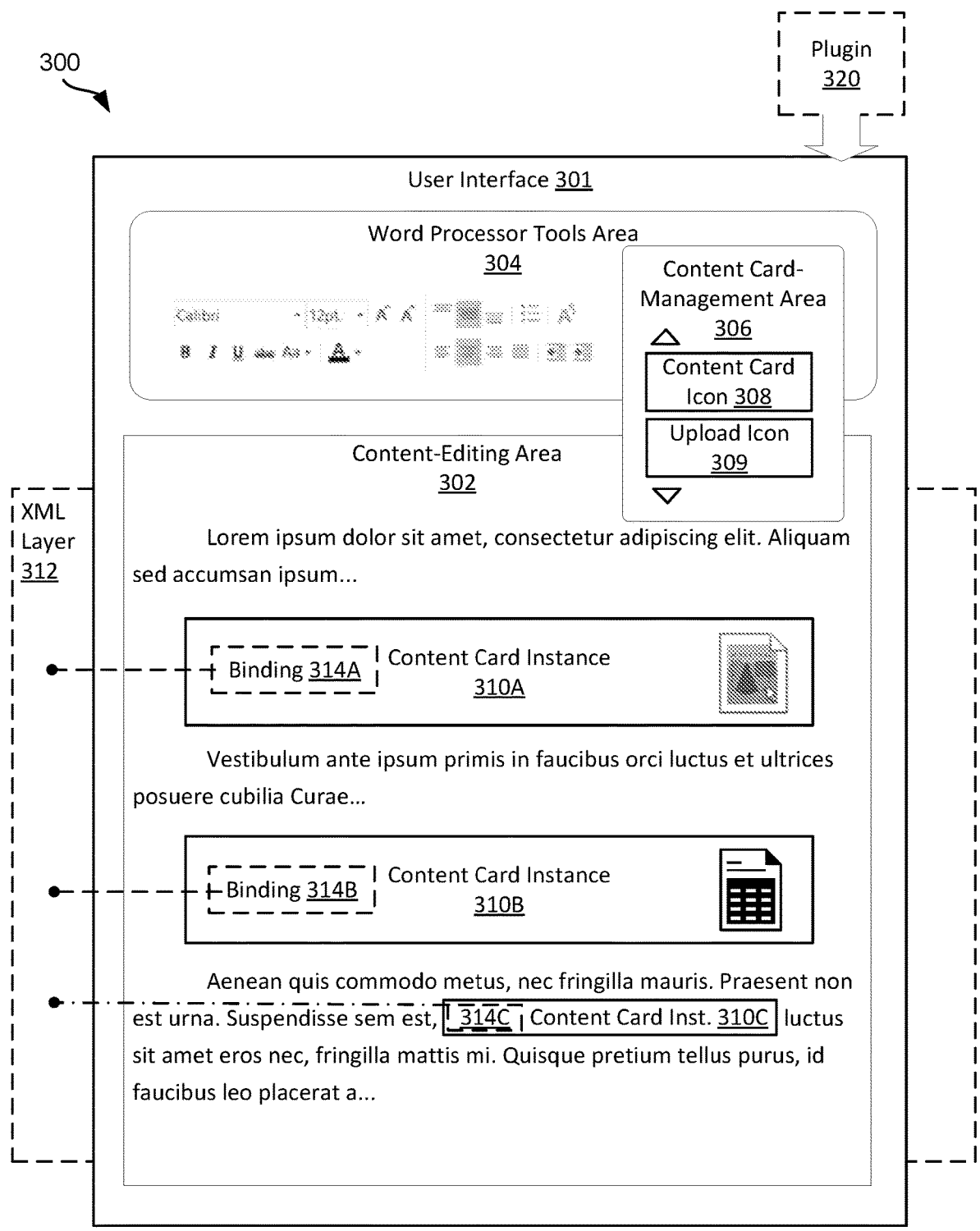
FIG. 3 is a schematic diagram of a word processor application with an example integrated content card management plugin for managing content cards present in the document.

FIG. 3 is a schematic diagram of a word processor application 300, according to a non-limiting embodiment. The word processor application 300 is running on a client device in communication with a content-management server over a network connection. The application includes a plugin 320 for integrating with a content-management server for ease of transferring information via content cards. The word processor application 300 may generally be configured for creating and editing documents where the documents are stored in files. However, using the features described herein, the word processor application 300 can be used to create and edit documents and/or content for use in documents that are stored not in files, but distributed on a content-management server.

The application includes a user interface 301 showing an opened document, which includes a content-editing area 302 where content can be generated and edited by a user, a word processor tools area 304, and a content card management area 306. The content included in the document is organized and stored in the background in XML layer 312. The XML layer 312 provides the organizational structure, formatting, and raw content, displayed in content-editing area 302. Although in the present embodiment an XML layer 312 is shown, in other embodiments, other background layers of other markup languages or other background formatting, may be used.

The content-editing area 302 includes various types of content, including text, tables, images, and other content, formatted and organized according to XML layer 312. The content-editing area 302 also includes content card instances 310A, 310B, and 310C (generally termed content card instances 310). As an example, content card instance 310A contains image content, content card instance 310B includes a table with tabular numerical data, and content card instance 310C includes text. Content card instances 310 can wrap around or overlay the other content in the content-editing area 302 as the XML layer 312 dictates. Content card instances 310A, 310B, 310C, are embedded into the document via content bindings 314A, 314B, and 314C, respectively (generally termed bindings 314), in XML layer 312. Bindings 314 provide an anchor for content card instances 310 in the content-editing area 302 and provide a linkage through which data may be transmitted to and from the content-management server through plugin 320.

Using the content card management area 306, a user can select an existing content card using content card icon 308 to import a content card instance into the content-editing area 302. Where a content card is imported into content-editing area 302, an empty content card instance 310 is generated in the document, with a binding 314 linking into XML layer 312. Raw content is then transmitted by the content-management server through plugin 320 for use as content in the new content card instance 310. Thus, a user can manipulate content for the use in documents without the content being stored in files. Drag-and-drop functionality may be employed, whereby a user may drag and drop a new content card into content-editing area 302.

Using the content card management area 306, a user can also upload/generate a new content card using upload icon 309. The content card management area 306 can include drag-and-drop functionality, whereby a user may drag a content card from the content card management area 306, or may generate a new content card by selecting text, a table, an image, or other content in the content-editing area 302, and dropping the selected content into upload icon 309. The plugin 320 may then communicate with the content-management server to generate a new content card template on the content-management server, or update an existing content card template, as appropriate. Thus, the user does not need to store the document in files, and can more freely share the content with other users, and manage versioning and access permissions, to such content, using content cards.

Figure 4B:
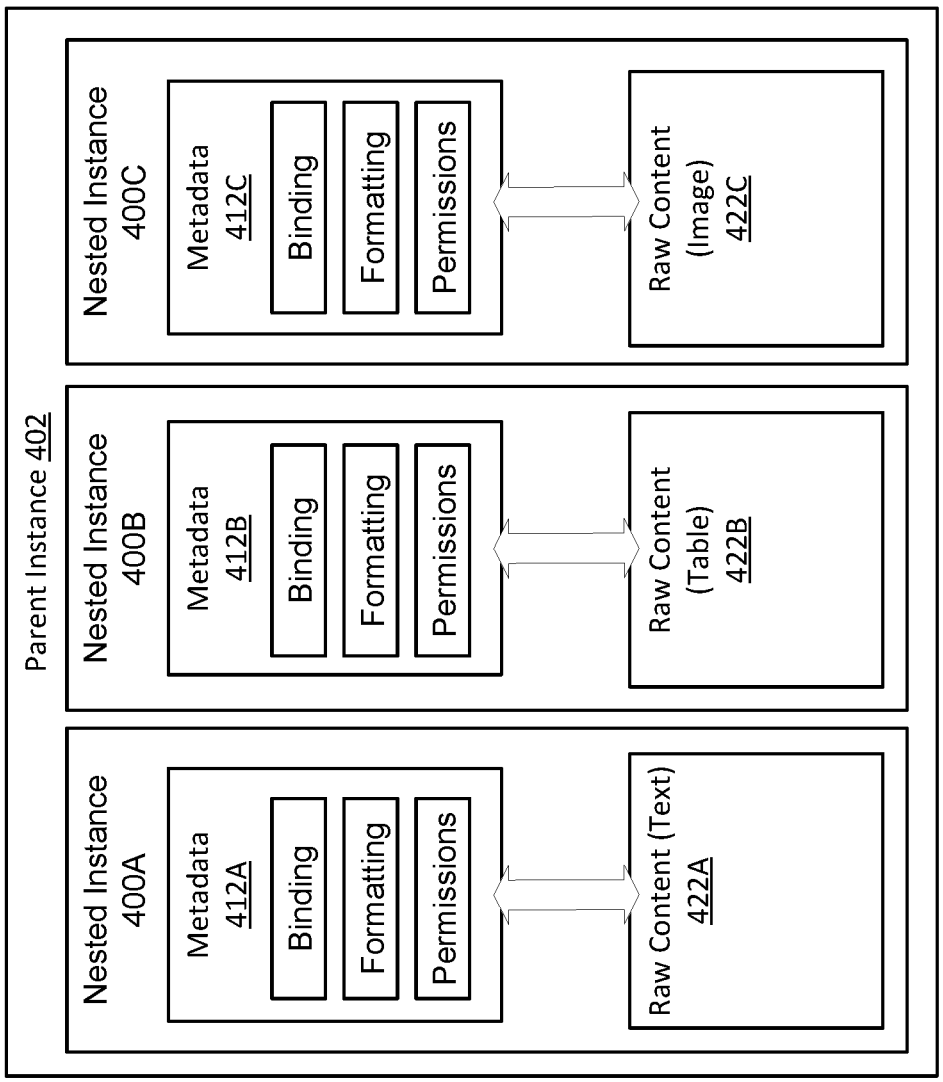
FIG. 4B is a schematic diagram of an example parent content card instance associated with several nested content card instances.
Figure 4A:
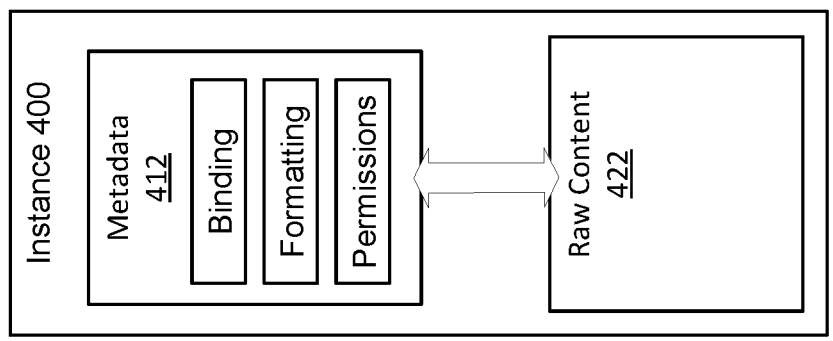
FIG. 4A is a schematic diagram of an example content card instance.

FIG. 4A is a schematic diagram of a content card instance 400, according to a non-limiting embodiment. A content card instance 400 includes metadata 412 and raw content 422 and associated metadata 412.

Raw content 422 can include any type of raw content, including text, table, or image. The metadata 412 includes the binding, formatting, and permissions data associated with raw content 422.

The content card instance 400 is associated with a content card template on a content-management server. The content card template stores the raw content 422, different versions thereof, and the associated metadata. Where, for example, text raw content 422 is updated in the content card template, the updated raw content can be pulled to instance 400 to replace text raw content 422 in a document through a binding in the file.

The permissions data in metadata 412 can set permissions restrictions on which users may view certain raw content 422 pulled to a content card instance 400. Further, permissions data can include permissions restrictions on which users may edit, insert into, or update, certain raw content 422.

The permission system may also use a policy engine powered by blockchain or distributed ledger technology to determine the permissions of a particular content card, and delegate decryption access to the requesting user provided they pass the policy engine test.

Thus, collaboration on documents can be more granularly managed at the content level. For example, a group of workers building a project proposal comprising text, images, and tabular data, can generate the document using a plurality of content card instances for the raw content. Editing of certain portions of raw content can be restricted to particular teams. For example, the artwork in the project proposal may be restricted to a first team, such as a team of graphic designers, the text content can be restricted to a second team, such as a team of copywriters, and the tabular content can be restricted to a third team, such as a team of developers.

Although one piece of raw content 422 is shown, it is to be understood that several different pieces of content, including text, table, video, sound, and images, can be included in raw content 422. The metadata 412 applies formatting, binding, and permissions to the raw content 422 as a whole.

Further, it is to be understood that content card instances 400 can be nested, whereby a child content card instance 400 can be associated with a parent content card instance 400. The child content card instance can be termed a nested content card instance. Where formatting or permissions are to be handled for different pieces of raw content differently, nested content card instances may be used, such as described in the following FIG. 4B.

FIG. 4B is a schematic diagram of a parent content card instance 402, according to a non-limiting embodiment. The parent instance 402 includes several nested instances 400A, 400B, and 400C (each may generally be referred to as instance 400).

Nested instances 400A, 400B, 400C, include raw content 422A, 422B, and 422C (each may generally be referred to as raw content 422), respectively. In the present embodiment, raw content 422A comprises text, raw content 422B comprises a table, and raw content 422C comprises an image. However, it is to be understood that in other embodiments, each piece of raw content 422 can include a combination of text, tables, and images.

Each nested instance 400A, 400B, 400C includes metadata associated with each piece of raw content 422A, 422B, 422C, indicated as metadata 412A, 412B, and 412C (each may generally be referred to as metadata 412). The metadata 412 includes the binding, formatting, and permissions data associated with raw content 422.

The parent content card instance 402 is associated with a content card template on a content-management server. The content card template stores the raw content 422, different versions thereof, and the associated metadata. Where, for example, text raw content 422A is updated in the content card template, the updated raw content can be pulled to nested instance 400A to replace text raw content 422A in a document through binding in the file. As another example, where the content card template is modified to change the formatting of text raw content 422A, the associated metadata can be pulled to nested instance 400A for inclusion into metadata 412A such that the text raw content 422A can be appropriately displayed in a document through binding in the file.

The permissions data in metadata 412 can set permissions restrictions on which users may view certain raw content 422 pulled to a content card instance 400. Further, permissions data can include permissions restrictions on which users may edit, insert into, or update, certain raw content 422.

Figure 5:
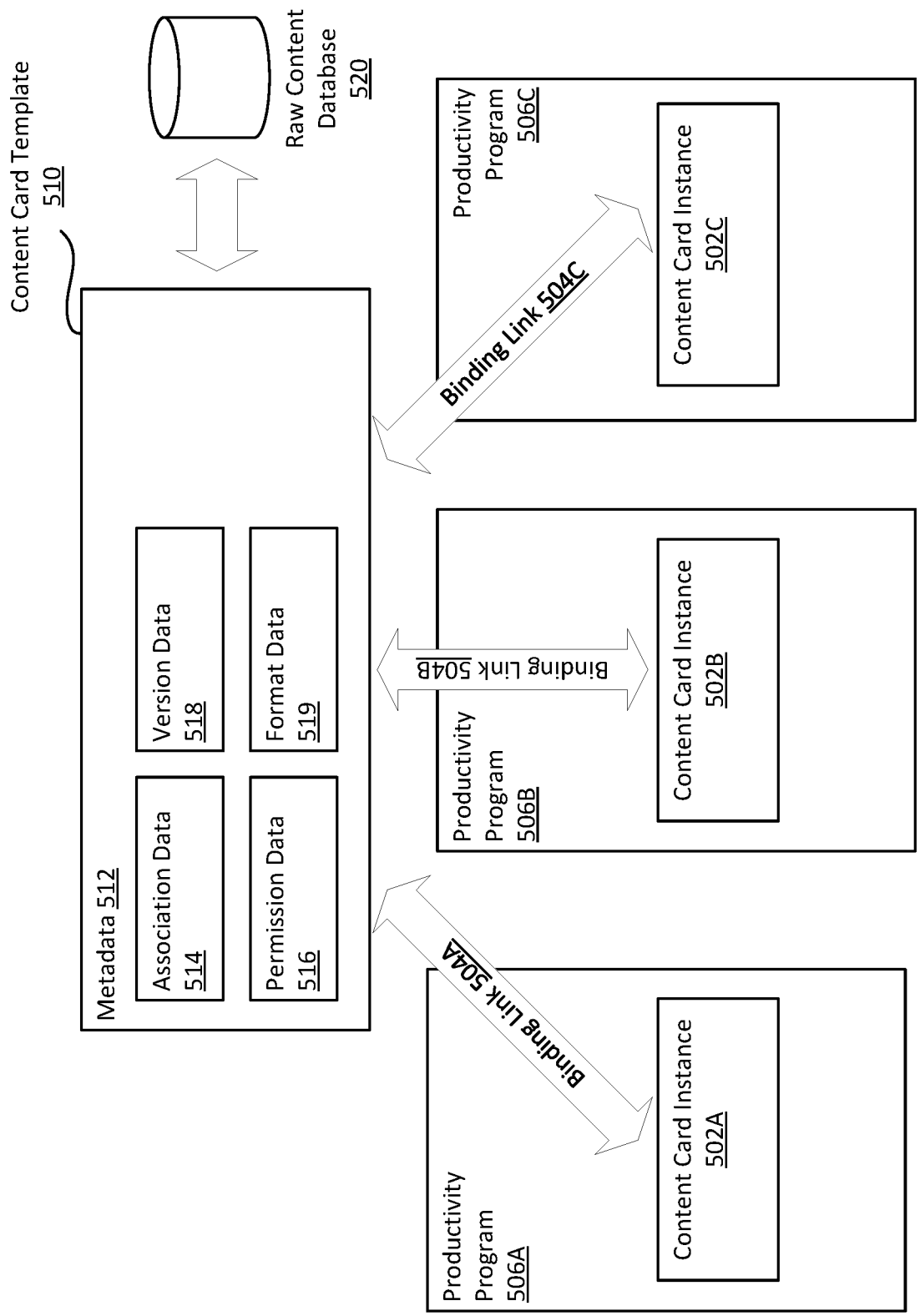
FIG. 5 is a schematic diagram of an example content card template showing associations with content card instances.

FIG. 5 is a schematic diagram of a content card template 510, according to a non-limiting embodiment. The content card template 510 serves as a mediator for uploading, downloading, sharing, editing versioning, and security control of content, for content card instances 502A, 502B, and 502C (generally termed content card instances 502), situated in productivity software programs 506A, 506B, and 506C, respectively, without the use of files.

Productivity software programs 506 may include different types of software programs. For example, productivity software program 506A may be a word processor, productivity software program 506B may be a spreadsheet processor, and productivity software program 506C may be a presentation processor. Furthermore, productivity software programs 506 may be part of separate productivity suits which store information in proprietary file types bundled together in a manner rendering the content inaccessible to workers without particular productivity software configured to read and manipulate the bundle.

Each content card instance 502 is linked to the content card template 510 by a binding link 504A, 504B, or 504C (generally termed binding link 504). A binding link may be formed through a content binding included in XML or other background data, as described in FIG. 3.

The content card template 510 includes metadata 512, including association data 514, version data 518, permission data 516, and format data 520.

Association data 514 includes references to binding links 504, and pointers between binding links 504 and content data, such as raw content stored on raw content database 520. For example, association data 514 includes a pointer indicating that content card instance 502A should be filled with a particular set of raw content stored on raw content database 520. As such, the appropriate data may be transmitted to content card instance 502A through binding link 504A.

Permission data 516 includes permissions restrictions defining which users may view certain raw content 422 pulled to a content card instance 400. Further, permissions data can include permissions restrictions on which users may edit, insert into, or update, certain raw content 422.

Version data 518 includes associations to separate versions of content card templates. Content card templates may include several versions, each of which includes different pointers to different sets of raw content in raw content database 520. Each content card template version may also differ in metadata, such as permissions or format data.

Format data 519 includes metadata relating to the formatting of raw content in content card instances 502. Format data 519 may include formatting data for different productivity software programs 506. Thus, where raw content is to be transmitted to a particular productivity software program 506, it may be transmitted along with the particular set of formatting data readable by that productivity software program 506, allowing the raw content to be viewed in a consistent manner across platforms.

Generally, metadata 512 may include any other metadata to enable congruent viewing and manipulation of raw content data across different productivity software programs. Thus, where a user stores information in a file on Google Docs, the metadata 512 includes all associated data for the presentation of the information in Google Docs. In addition, corresponding metadata 512 is generated to enable compatibility between other programs like Microsoft Word. Thus, where an instance of content card template 510 is inserted into a Microsoft Word document, the information is formatted properly and displayed in a manner congruent with how it is displayed in Google Docs. Where metadata 512 is not included which enables compatibility with a particular program, a user pulling a content card into the program may be prompted to select a set of metadata which may display the content in the most appropriate manner.

Furthermore, where content in a particular content card instance 502 is edited in one productivity software program 506, other associated content card instances 502 may be updated in a manner consistent with the edits to the edited content card instance 502.

Metadata 512 may also include grouping data, which includes associations between grouped content card templates 510. For example, a particular document, such as a contract used in the legal industry, may include several different content cards, each content card defining a particular term in the contract. Such content cards may be grouped together on a content-management server for organizational purposes. Thus, where a new contract is to be drafted, a user can more easily select related content cards to include into the document.

Figure 6:
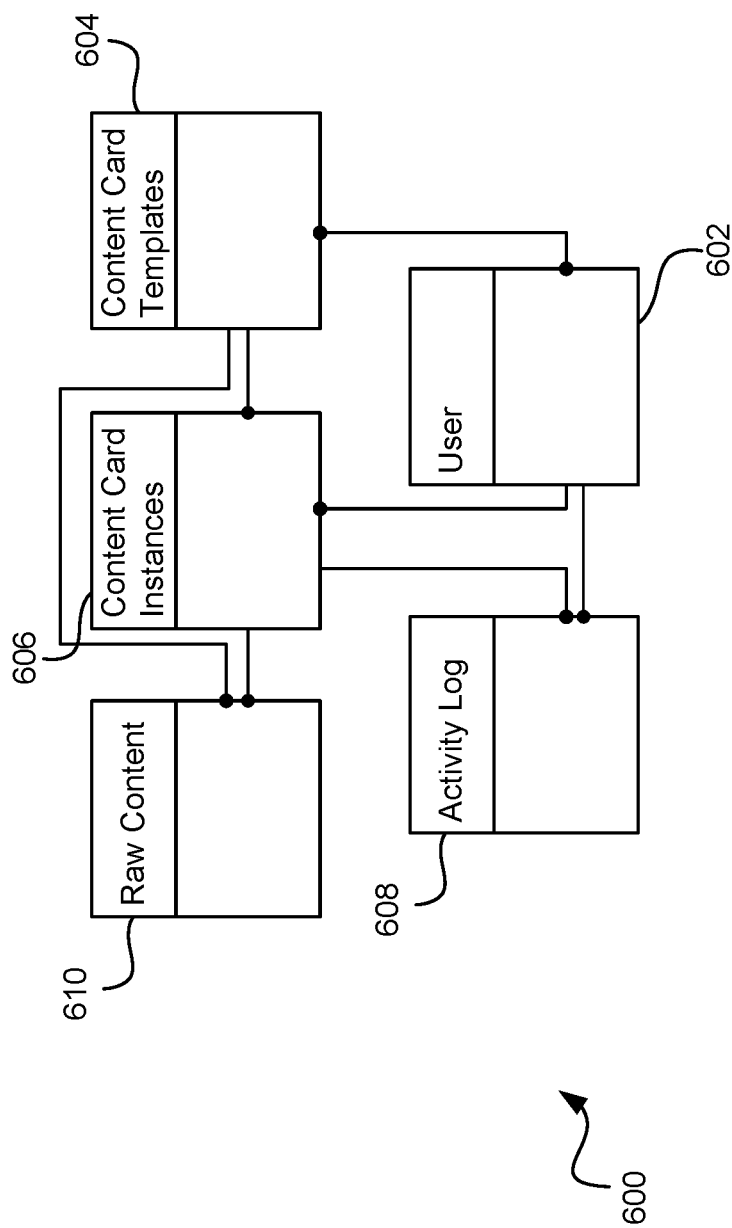
FIG. 6 is an example data structure diagram of a content card database.

FIG. 6 is a data structure diagram of a content card database 600 of a content-management server, according to a non-limiting embodiment. The content card database 600 includes several tables of data serving as the infrastructure for the management of content cards on a content-management server.

Content card database 600 includes a user table 602, content card template table 604, content card instance table 606, activity log table 608, and raw content table 610.

User table 602 includes attributes for identification tags, names, and other attributes for users who may interact with the content-management server. Each user may be related to one or more content card instances and may have one or more activity logs describing the user's interactions with content card instances. Each user may also be related to one or more content card templates.

Content card template table 604 includes attributes for identification tags, names, ownerships, descriptions, linkages to raw content, linkages to metadata, version data, permission data, and other attributes for content card templates stored on the content-management server. Each content card template may be related to one or more users who may interact with the content card template. Each content card template may be related to one or more content card instance with which the content card template is associated, and may be related to one or more stores of raw content.

Content card instances table 606 includes attributes for identification tags, linkages to raw content, linkages to content card templates, and other attributes for content card instances present in documents. Each content card instance may be related to one or more activity logs describing activities and edits made to content card instances.

Activity log table 608 includes attributes for identification tags, descriptions of activities, and other attributes for activities or edits made to content card instances.

Raw content table 610 includes stores of raw content present in content card instances and associated with content card templates. The raw content may be stored in any suitable format, such as in plain text, raw image formats, and markup languages such as XML, OOXML, and HTML, such that the information can be readily shared with users regardless of the productivity software program being used.

In some embodiments, data in the content card database 600 may be accessible through an application programming interface (API) which enables querying, and in some embodiments, adding to, or modifying, the content card database 600. The content card database 600 can thereby be integrated into software platforms. As one example, the plugin 320 in FIG. 3 may communicate with a content card database 600 through the API. In other embodiments, various third-party software platforms may integrate with the content card database 600 to, for example, receive updates to content. For example, a webpage platform may be integrated to include content card instances which may be pushed the most updated version of content. Thus, where a set of content associated with a content card template is edited in a productivity software application, a corresponding update could be pushed to a webpage having a content card associated with the same content card template.

Figure 7:
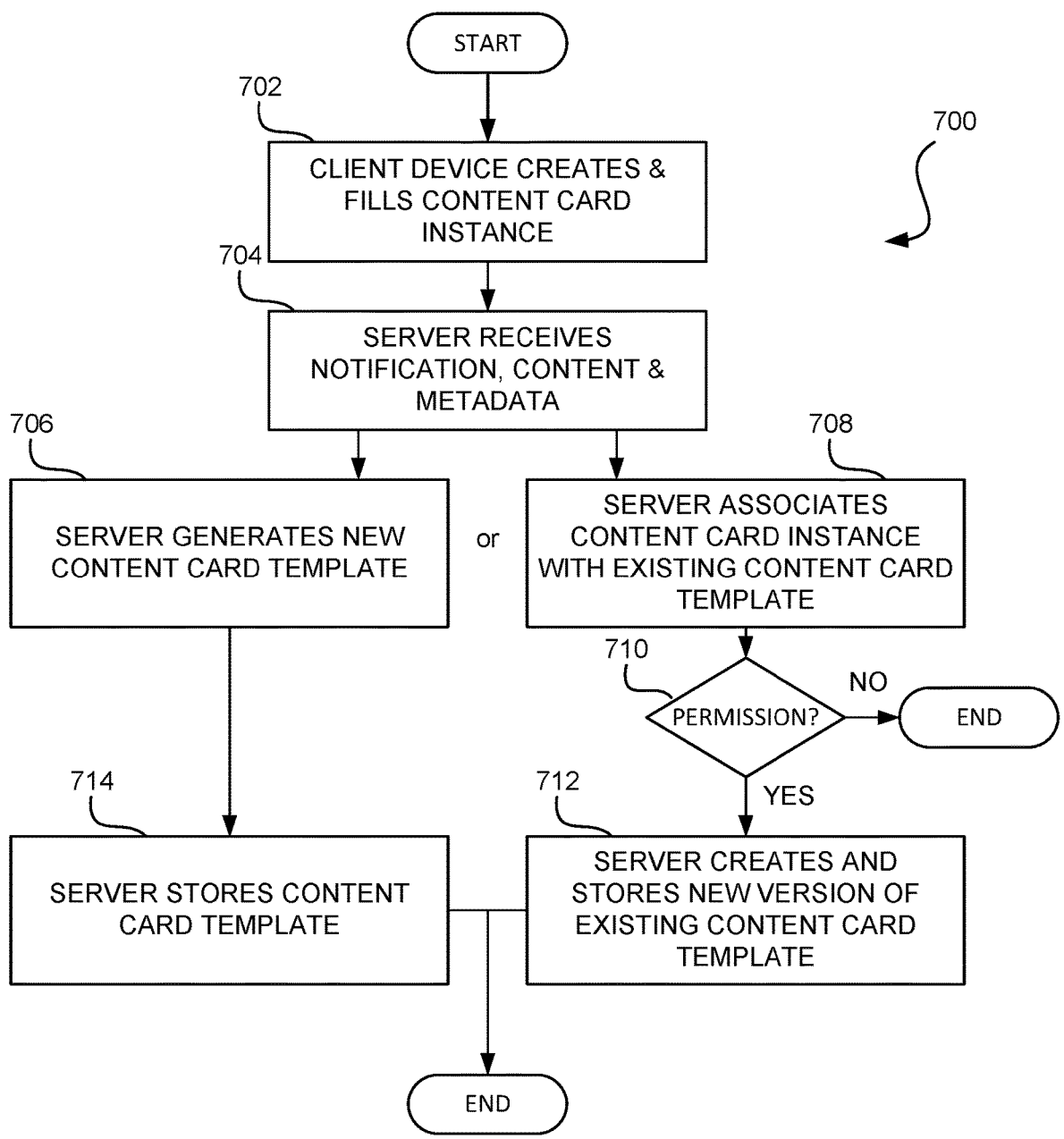
FIG. 7 is a flowchart showing an example method for generating a content card template.

FIG. 7 is a flowchart showing a method 700 for generating a content card template, according to a non-limiting embodiment. Briefly, a client device creates and fills an instance of a content card in a document, and a content-management server updates or generates a new associated content card template. It is to be emphasized, however, that the blocks of method 700 need not be performed in the exact sequence as shown. Further, although the method 700 may be described as performed by a system and device discussed herein, this is not limiting and the method can alternatively be performed by other systems and/or devices.

At block 702, a client device creates a content card instance and fills the content card instance. With reference to FIG. 3, a user of user interface 301 may generate text content in the content-editing area 302, format the text, and saves the text as a content card instance, such as by clicking the upload icon 309. In some embodiments, to generate and save a content card instance, a user may select the text, and drag-and-drop the selected text into content card management area 306. Plugin 320 may then generate a content card instance 310, and designate the selected text as filling the content card instance 310. FIG. 4 provides an example of a content card instance 400.

At block 704, a content-management server receives a notification that a content card instance has been created, and receives the associated content and metadata. With reference to FIG. 1, a content-management server 150 may receive the notification at content management program 160, via network connection 50, and the raw content and metadata may be stored in a content card database 158.

Where the newly created content card is meant to create a new version of an existing content card, block 708 is executed, and where the newly created content card is meant to create its own content card template, block 706 is executed.

At block 706, a content-management server generates a new content card template. At block 714, the content-management server stores the content card template. FIG. 5 provides an example of a content card template 510 and the metadata 512 stored therein.

At block 708, a content-management server associates the newly created content card instance with an existing content card template. At block 710, it is determined whether the user creating the content card instance has permission to edit the existing content card template. Where permission is granted, block 712 is executed, where the content-management server creates a new version of the existing content card template.

Thus, users can generate new content and share the content to other users through a content-management server, with the content being compatible across different productivity software applications.

Figure 8:
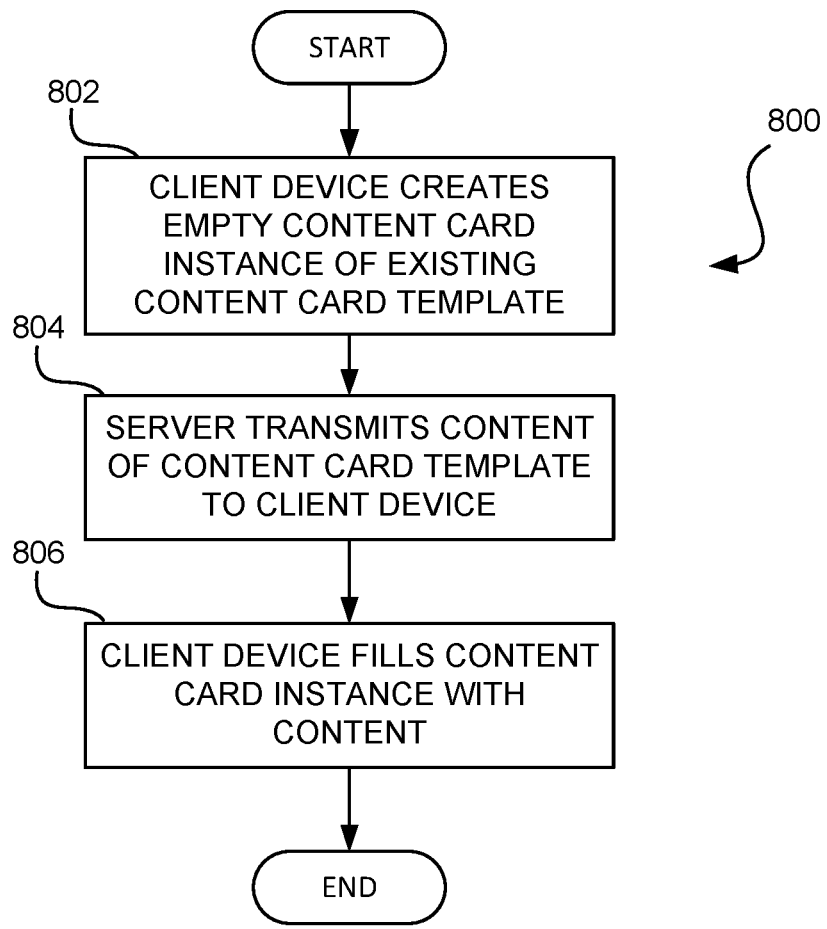
FIG. 8 is a flowchart showing an example method for pulling content to a content card instance using a content card template.

FIG. 8 is a flowchart showing a method 800 for pulling content to a content card instance using a content card template, according to a non-limiting embodiment. Briefly, a client device creates an empty content card instance to which raw content and metadata are pulled from a content-management server. It is to be emphasized, however, that the blocks of method 800 need not be performed in the exact sequence as shown. Further, although the method 800 may be described as performed by a system and device discussed herein, but this is not limiting and the method can alternatively be performed by other systems and/or devices.

At block 802, a client device creates an empty content card instance associated with an existing content card template present on a content-management server.

At block 804, the content-management server transmits raw content and associated metadata to the client device for use as content into the empty content card instance.

At block 806, the client device fills the empty content card instance with the transmitted content.

Thus, users may receive content shared on a content-management server, and use the content to build documents using content cards. In some embodiments, the method 800 may include a block where one of the content-management server and the client device check the permission of a user using the client device to retrieve the content. In some embodiments, the content-management server may transmit metadata including formatting data enabling the content to be viewed and manipulated in a congruent manner across different platforms.

Figure 9:
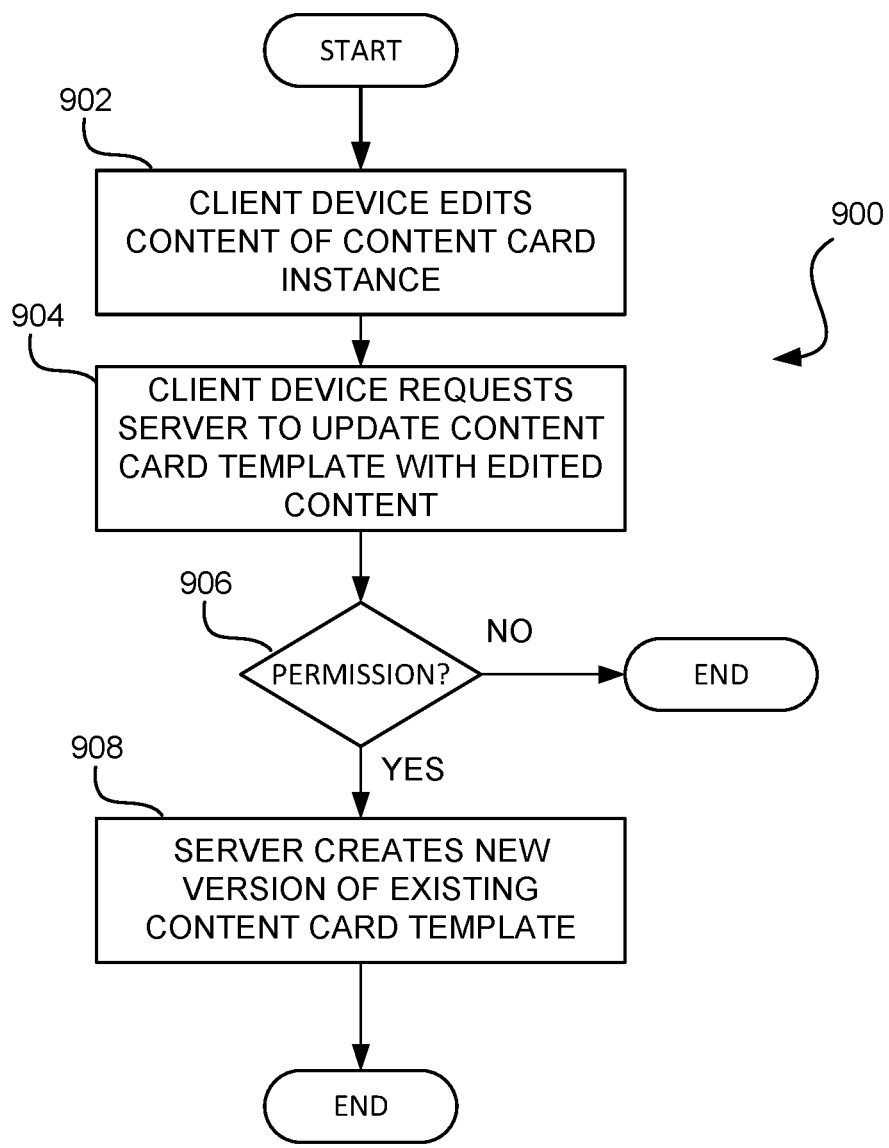
FIG. 9 is a flowchart showing an example method for editing content associated with a content card template.

FIG. 9 is a flowchart showing a method 900 for editing content associated with a content card template, according to a non-limiting embodiment. Briefly, a client device edits a content card instance, and where permissions are granted, a content-management server updates the associated content card template. It is to be emphasized, however, that the blocks of method 900 need not be performed in the exact sequence as shown. Further, although the method 900 may be described as performed by a system and device discussed herein, but this is not limiting and the method can alternatively be performed by other systems and/or devices.

At block 902, a client device termed an editing client device, edits the content of a content card instance. The content card instance, termed an editing content card instance, may be present in a file opened by a productivity software application running on the client device. A user of the client device may edit the raw content or the formatting of the content in the content card instance.

At block 904, a client device requests to a content-management server that a content card template should be edited. Editing the content card template may include creating a new version of the content card template.

At block 906, it is determined whether the user making the edit has permission to edit the content card template or to create a new version of the content card template. Where permission is granted, block 908 is executed.

At block 908, the content-management server edits or creates a new version of the content card template. Editing or creating a new version of the content card template may entail storing new raw content on the content-management server, adjusting pointers to the new raw content, and storing metadata such as format data, permission data, and version data.

Thus, users may edit or update existing content cards, and share the updates with other users.

Figure 10:
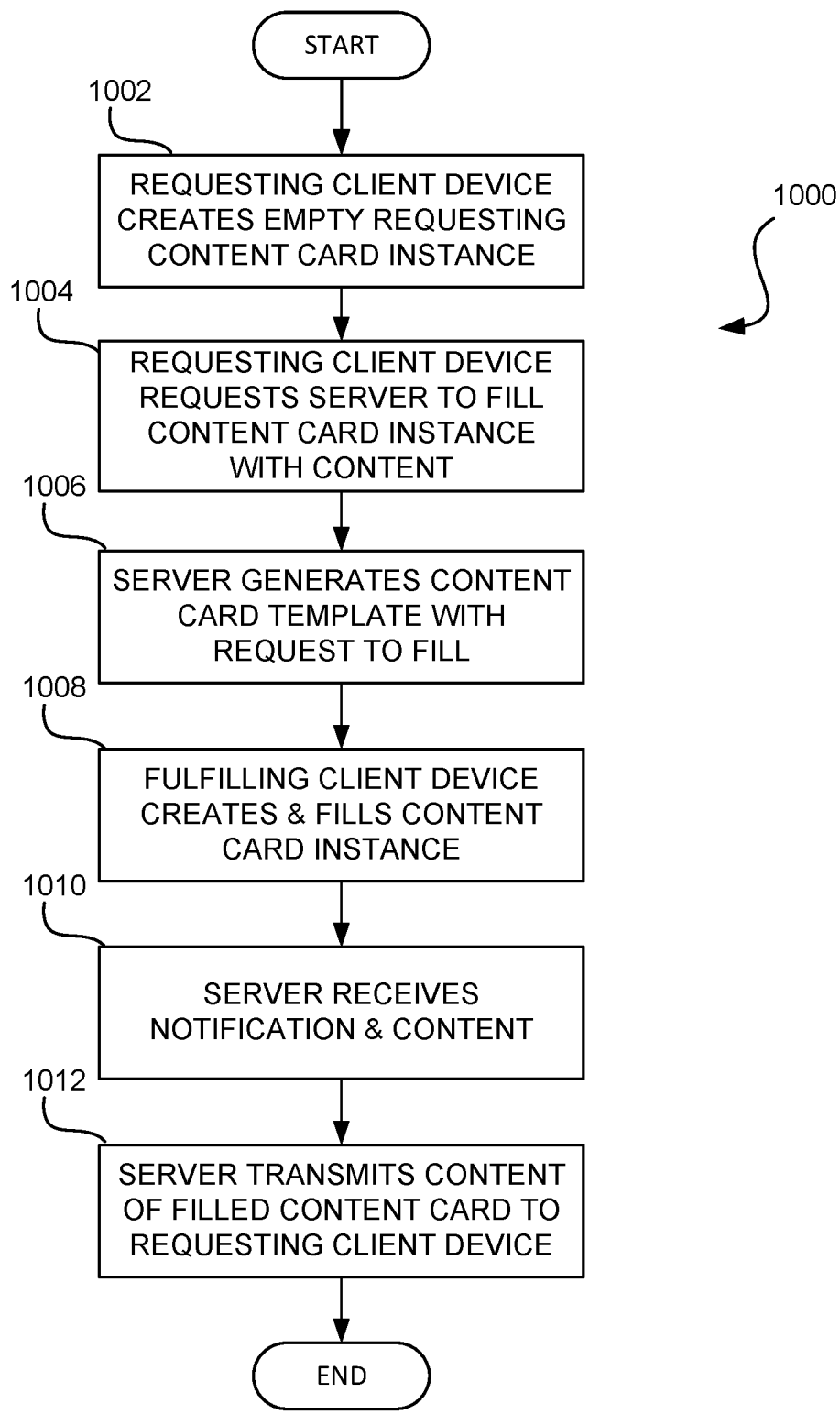
FIG. 10 is a flowchart showing an example method for creating and fulfilling a request content card.

FIG. 10 is a flowchart showing a method 1000 for creating and fulfilling a request content card, according to a non-limiting embodiment. Briefly, a client device creates an empty content card associated with a request for the content card to be filled, and another client device fulfills the request by generating new content, which is transmitted to the requesting client device for use as content in the empty content card. It is to be emphasized, however, that the blocks of method 1000 need not be performed in the exact sequence as shown. Further, although the method 1000 may be described as performed by a system and device discussed herein, but this is not limiting and the method can alternatively be performed by other systems and/or devices.

At block 1002, a requesting client device creates an empty request content card instance. The requesting content card instance is associated with a request for the request content card instance to be filled.

At block 1004, the requesting client device makes a request to a content-management server that the requesting content card instance be filled with content.

At block 1006, the content-management server generates a content card template, termed a requesting content card template, including a request for content.

At block 1008, another client device termed the fulfilling client device, creates and fills a fulfilling content card instance, intended to fill the requesting content card instance.

At block 1010, the content-management server receives a notification that the fulfilling client device has created the fulfilling content card instance, and receives the content and associated metadata.

At block 1012, the content-management server transmits the content and associated metadata of the fulfilling content card instance to the requesting client device for use as content into the requesting content card instance.

Thus, users collaborating on projects can create placeholder content card instances in a document to be filled by colleagues. Permissions may be set so that only particular colleagues may fulfill the request.

Figure 11:
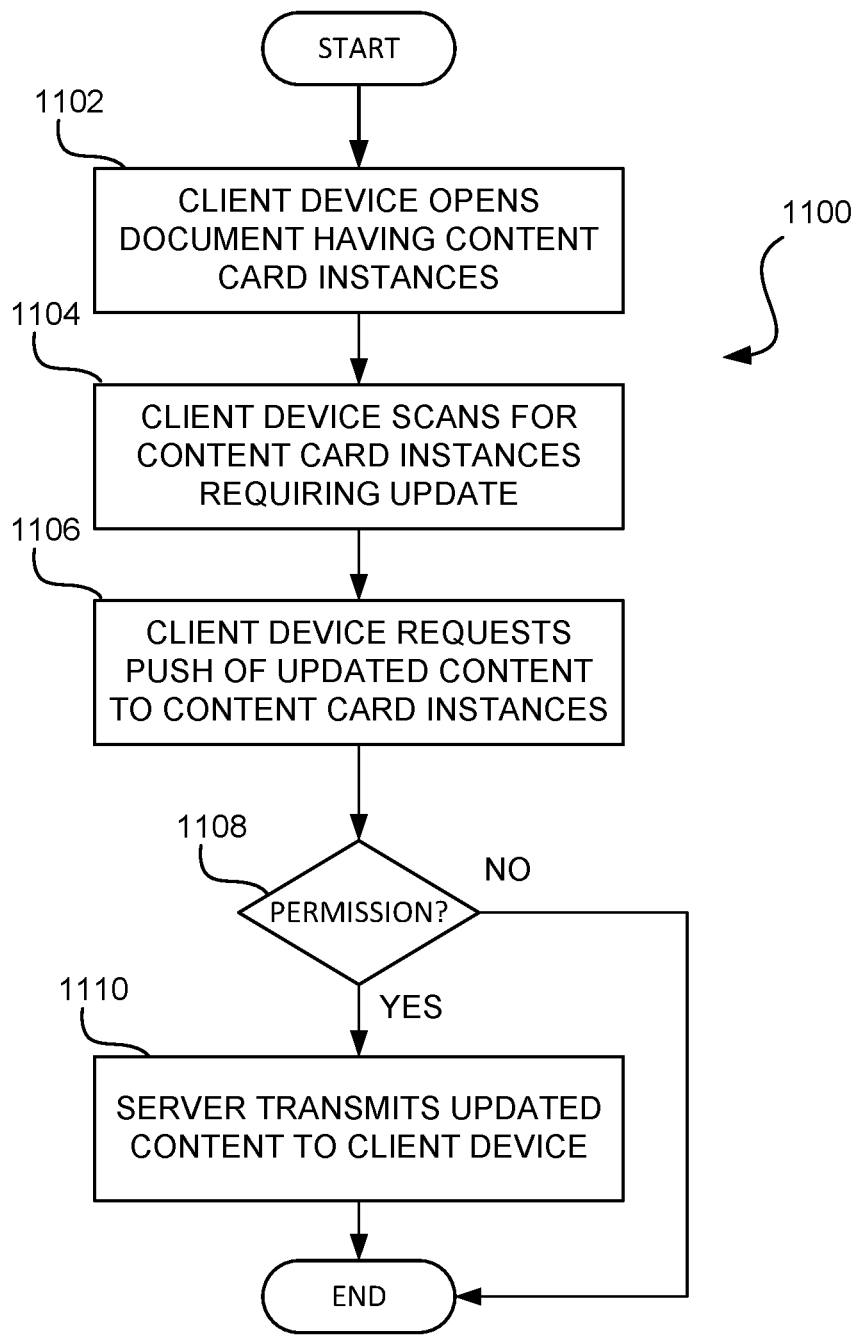
FIG. 11 is a flowchart showing an example method for updating content card instances in a document.

FIG. 11 is a flowchart showing a method 1100 for updating content card instances in a document, according to a non-limiting embodiment. Briefly, a user opens a document, and the document is scanned and updated for content card updates, which are transmitted to the client device where permissions so enable. It is to be emphasized, however, that the blocks of method 1100 need not be performed in the exact sequence as shown. Further, although the method 1100 may be described as performed by a system and device discussed herein, but this is not limiting and the method can alternatively be performed by other systems and/or devices.

At block 1102, a client device opens a document having content card instances present in the document.

At block 1104, the client device scans the document for content card instances requiring an update. With reference to FIG. 3, plugin 320 may scan the content-editing area 302 for content card instances 310, and communicate with a content-management server to check for newer versions of the content card instances 310. The client device may be termed a scanning client device.

At block 1106, where the client device identifies a content card with an updated version on the content-management server, the client devices request a pull of the updated version of the content card for use as content into the content card instance in the document.

At block 1108, it is determined whether the user of the client device has permission to access the updated version of the content card. Where permission is granted, block 1110 is executed.

At block 1110, the content-management server transmits the updated content card to the client device for inclusion into the content card instance.

Thus, users can remain updated with the latest version of contents to be included in documents.

It can, therefore, be seen that a system can provide for fileless content management which allows for simplified collaboration and sharing of information through the use of content cards. Thus, instead of storing information in files, a user is able to store the information in smaller, more manageable portions, through content cards, which can be independently shared, edited, updated, and controlled.

In addition to providing ease of collaboration through plugins with productivity software applications, standalone software applications may provide for the direct management of content cards on a content-management server. Such standalone applications may be used to browse content, content card templates, to adjust permissions, and other metadata stored on the content-management server. Such standalone applications may be implemented as web applications, mobile device applications, or as software development kits providing API for interacting with a content card database. Such applications may be continually connected to the content-management server or may be periodically synced with the content-management server, while otherwise operating offline. Other examples of standalone applications include marketplaces for third-party software integrated with the content-management server.

Furthermore, although the embodiments described herein discuss the integration of a content-management server with productivity software applications, it is also contemplated that the content-management server may be integrated with other software and web applications. For example, a webpage may be integrated with the content-management server so that updates to content made in productivity software applications are automatically pushed to the web page. In other examples, social media platforms may pull content from, or be able to push content to, the content-management server, and so that links to content cards can be shared online. In other examples, messaging applications may similarly be integrated with the content-management server, so that links to content cards can be shared between individuals. In other examples, computer operating systems may be linked directly with a content-management server, so that content accessible throughout the use of the operating system can be pushed to the content-management server, and content can be used by the operating system.

In addition to providing ease of collaboration and sharing of information, the storage of content in the form of content cards enables the application of several power analytical methods. With data on a content-management server accessible by an API, raw content can be easily queried and analyzed. The data can be used in data visualizations.

In the case of text data, text analysis can be applied to study grammar usage, word usage, sentiment, and to categorize/segment snippets of content. Natural language processing can be applied to categorize content cards according to relationships in text content. Where an organization relies heavily on content cards, data inconsistencies across documents can be identified. Advanced language editing techniques may be applied. For example, an organization may enforce consistent spelling/grammar across all of its documents linked through the content-management server. As another example, text content may be translated to different languages by applying machine translation technology when a particular content card is requested in a particular language, or by storing different instances of text content in a database, with content card templates including metadata to point to particular linguistic versions of text content.

Furthermore, in addition to logging user activities in a content card database, the editing history of content cards can be integrated with blockchain technology, whereby an audit trail of user interactions with content cards, raw data, metadata, and permission-related data, can be stored publicly on a distributed ledger in an immutable tamper-proof format. Thus, objects of a content card database may be stored in a distributed storage system, hosted across a decentralized network of computing devices, with editing and version control collectively managed on the blockchain.

While the examples discussed herein are directed to specific example systems, devices, and methods, it will be understood that combinations, subsets, and variations of the examples are within the scope of the present disclosure.

The scope of the claims should not be limited by the embodiments set forth in the above examples but should be given the broadest interpretation consistent with the description as a whole.

The invention claimed is:

1. A system for digital information management, the system comprising:
   at least one client device having an associated graphical display surface and a client user interface to concurrently display a content-editing area and a content card-management area on respective graphical display surfaces generated by different productivity programs that are not required to be compatible;
   a computer network;
   a content-management server having a network interface in communication with the at least one client device via the computer network, a memory for storing programming instructions and for storing content data and content card template metadata, and a processor in communication with the network interface and the memory, the processor configured to receive, store, and transmit content data via content card templates, wherein a content card template comprises metadata associating content data stored in the memory with a content binding in the content-editing area of the at least one client device; and
   wherein the content card-management area is configured to create, import, and share the content card template into the content-editing area, wherein the content card template is configured to operate as an intermediary to store, retrieve, share, edit, manage, and/or control content card instances, and wherein a content card instance is configured to relate to an associated content card template;
   wherein the content-editing area is configured to display a structure of the content card instances and editable content thereof as arranged within the content-editing area by respective content bindings among other content that is stored, displayable, and editable directly by the different productivity programs without the content bindings, and wherein the respective content bindings enable each of the different productivity programs to access the editable content of the content card instances.

2. The system of claim 1, wherein the processor of the content-management server is configured to receive and store content data by:
   receiving a notification from a first client device that a first content card instance including a first portion of content was created in the content-editing area of the first client device, the first content card instance including in metadata a first content binding associated with the first portion of content;
   receiving the first portion of content routed through the first content binding;
   storing the first portion of content in the memory; and
   generating a first content card template associated with the first content card instance, the first content card template including metadata associating the first portion of content with the first content binding of the first content card instance.

3. The system of claim 2, wherein the processor of the content-management server is configured to transmit content data by:
   receiving a notification from a second client device that a second content card instance was created in the content-editing area of the second client device, the second content card instance including a second content binding associated with the first content card template; and
   transmitting the first portion of content to the second client device routed through the second content binding for use as content in the second content card instance.

4. The system of claim 2, wherein the processor of the content-management server is further configured to update a subsequent content card template by:
   receiving a notification from an editing client device that an edit has been made to the first portion of content in an editing content card instance in the content-editing area of the editing client device to generate an edited first portion of content, the editing content card instance including in metadata an editing content binding associated with the first content card template;
   receiving the edited first portion of content routed through the editing content binding;
   storing the edited first portion of content in the memory; and
   updating the metadata of the first content card template to associate the first content card template with the edited first portion of content.

5. The system of claim 4, wherein the processor of the content-management server is further configured to verify permission of the editing client device to edit the first portion of content prior to updating the metadata of the first content card template.

6. The system of claim 4, wherein the processor of the content-management server is further configured to:
designate the first portion of content as a first version of the first portion of content in the metadata of the first content card template prior to updating the metadata of the first content card template; and
designate the edited first portion of content as a second version of the first portion of content in the metadata of the first content card template following updating the metadata of the first content card template.

7. The system of claim 2, wherein the at least one client device includes a scanning client device, the scanning client device to open a document and, upon opening the document, scan the document for content card instances, and to request to the content-management server that content data of a content card instance in the document be updated according to an associated content card template.

8. The system of claim 2, wherein the at least one client device includes a text-editing client device having a client user interface comprising a word processor, and wherein the first portion of content comprises text.

9. The system of claim 2, wherein the at least one client device includes a spreadsheet-editing client device having a client user interface comprising a spreadsheet processor, and wherein the first portion of content comprises tabular numerical data.

10. The system of claim 2, wherein the at least one client device includes a presentation-editing client device having a client user interface comprising a presentation processor, and wherein the first portion of content comprises an image.

11. The system of claim 2, wherein the first content card instance comprises a nested content card instance of a parent content card instance.

12. The system of claim 2, wherein the first portion of content comprises a combination of at least two of text, tabular numerical data, and an image.

13. The system of claim 2, wherein the at least one client device includes a messaging client device having a messaging application, and wherein the first portion of content comprises text.

14. The system of claim 1, wherein the processor of the content-management server is further configured to receive content data by:
receiving a notification from a requesting client device that a requesting content card instance was created in the content-editing area of the requesting client device, the requesting content card instance including in metadata a requesting content binding;
generating a requesting content card template associated with the requesting content card instance, the requesting content card template including metadata associating the requesting content card template with the requesting content card instance;
receiving a notification from a fulfilling client device that a fulfilling content card instance including fulfilling content was created in the content-editing area of the fulfilling client device, the fulfilling content card instance including in metadata a fulfilling content binding associated with the requesting content card template;
receiving the fulfilling content routed through the fulfilling content binding;
storing the fulfilling content in the memory; and
transmitting the fulfilling content to the requesting client device routed through the requesting content binding for use as content in the requesting content card instance.

15. A content-management server comprising:
a network interface in communication with at least one client device via a computer network, the at least one client device having a client user interface generated by a productivity program to concurrently display a content-editing area and a content card-management area, the productivity program being one of a plurality of different productivity programs that are not required to be compatible;
a memory for storing programming instructions and for storing content data and content card template metadata; and
a processor in communication with the network interface and the memory, the processor configured to receive, store, and transmit content data via content card templates, wherein a content card template comprises metadata associating content data stored in the memory with a content binding in the content-editing area of the at least one client device; and
wherein the content card-management area is configured to create, import, and share content card templates into the content-editing area, wherein a content card template is configured to operate as an intermediary to store, retrieve, share, edit, manage, and/or control content card instances, and wherein the content card instance is configured to relate to an associated content card template;
wherein the content-editing area is configured to display a structure of the content card instances and editable content thereof as arranged within the content-editing area by respective content bindings among other content that is stored, displayable, and editable directly by the different productivity programs without the content bindings, and wherein the respective content binding enable each of the different productivity programs to access the editable content of respective content card instances.

16. The content-management server of claim 15, wherein the processor of the content-management server is configured to receive and store content data by:
receiving a notification from a first client device that a first content card instance including a first portion of content was created in the content-editing area of the first client device, the first content card instance including in metadata a first content binding associated with the first portion of content;
receiving the first portion of content routed through the first content binding;
storing the first portion of content in the memory; and
generating a first content card template associated with the first content card instance, the first content card template including metadata associating the first portion of content with the first content binding of the first content card instance.

17. The content-management server of claim 16, wherein the processor of the content-management server is configured to transmit content data by:
receiving a notification from a second client device that a second content card instance was created in the content-editing area of the second client device, the second content card instance including a second content binding associated with the first content card template; and
transmitting the first portion of content to the second client device routed through the second content binding for use as content in the second content card instance.

18. The content-management server of claim 16, wherein the processor of the content-management server is further configured to update a subsequent content card template by:
receiving a notification from an editing client device that an edit has been made to the first portion of content in an editing content card instance in the content-editing area of the editing client device to generate an edited first portion of content, the editing content card instance including in metadata an editing content binding associated with the first content card template;
receiving the edited first portion of content routed through the editing content binding;
storing the edited first portion of content in the memory; and
updating the metadata of the first content card template to associate the first content card template with the edited first portion of content.

19. The content-management server of claim 18, wherein the processor of the content-management server is further configured to verify permission of the editing client device to edit the first portion of content prior to updating the metadata of the first content card template.

20. The content-management server of claim 18, wherein the processor of the content-management server is further configured to:
designate the first portion of content as a first version of the first portion of content in the metadata of the first content card template prior to updating the metadata of the first content card template; and
designate the edited first portion of content as a second version of the first portion of content in the metadata of the first content card template following updating the metadata of the first content card template.

21. The content-management server of claim 15, wherein the processor of the content-management server is further configured to receive content data by:
receiving a notification from a requesting client device that a requesting content card instance was created in the content-editing area of the requesting client device, the requesting content card instance including in metadata a requesting content binding;
generating a requesting content card template associated with the requesting content card instance, the requesting content card template including metadata associating the requesting content card template with the requesting content card instance;
receiving a notification from a fulfilling client device that a fulfilling content card instance including fulfilling content was created in the content-editing area of the fulfilling client device, the fulfilling content card instance including in metadata a fulfilling content binding associated with the requesting content card template;
receiving the fulfilling content routed through the fulfilling content binding;
storing the fulfilling content in the memory; and
transmitting the fulfilling content to the requesting client device routed through the requesting content binding for use as content in the requesting content card instance.

22. A method for managing digital information, the method comprising:
maintaining content data, maintaining a content card template associated with the content data;
transmitting the content data to a productivity program at a client device for inclusion into a content card instance associated with the content card template, the productivity program being one of a plurality of different productivity programs that are not required to be compatible, wherein the content card template is configured to operate as an intermediary to store, retrieve, share, edit, manage, and/or control content card instances, and wherein a content card instance is configured to relate to an associated content card template; and
displaying a structure of the content card instances and editable content thereof as arranged within the content-editing area by respective content bindings among other content that is stored, displayable, and editable at the client device directly by the productivity program without the content bindings, wherein the respective content bindings enable each of the different productivity programs to access the editable content of respective content card instances.

23. The method of claim 22, further comprising:
receiving a notification from a first client device that a first content card instance including a first portion of content was created in a content-editing area of the first client device, the first content card instance including in metadata a first content binding associated with the first portion of content;
receiving the first portion of content routed through the first content binding;
storing the first portion of content in a memory; and
generating a first content card template associated with the first content card instance, the first content card template including metadata associating the first portion of content with the first content binding of the first content card instance.

24. The method of claim 23, further comprising:
receiving a notification from a second client device that a second content card instance was created in the content-editing area of the second client device, the second content card instance including a second content binding associated with the first content card template; and
transmitting the first portion of content to the second client device routed through the second content binding for use as content in the second content card instance.

25. The method of claim 24, further comprising:
receiving a notification from an editing client device that an edit has been made to the first portion of content in an editing content card instance in the content-editing area of the editing client device to generate an edited first portion of content, the editing content card instance including in metadata an editing content binding associated with the first content card template;
receiving the edited first portion of content routed through the editing content binding;
storing the edited first portion of content in the memory; and
updating the metadata of the first content card template to associate the first content card template with the edited first portion of content.

26. The method of claim 25, further comprising verifying permission of the editing client device to edit the first portion of content prior to updating the metadata of the first content card template.

27. The method of claim 25, further comprising:
designating the first portion of content as a first version of the first portion of content in the metadata of the first content card template prior to updating the metadata of the first content card template; and
designating the edited first portion of content as a second version of the first portion of content in the metadata of the first content card template following updating the metadata of the first content card template.

28. The method of claim 22, further comprising:
receiving a notification from a requesting client device that a requesting content card instance was created in the content-editing area of the requesting client device, the requesting content card instance including in metadata a requesting content binding;
generating a requesting content card template associated with the requesting content card instance, the requesting content card template including metadata associating the requesting content card template with the requesting content card instance;
receiving a notification from a fulfilling client device that a fulfilling content card instance including fulfilling content was created in the content-editing area of the fulfilling client device, the fulfilling content card instance including in metadata a fulfilling content binding associated with the requesting content card template;
receiving the fulfilling content routed through the fulfilling content binding;
storing the fulfilling content in a memory; and
transmitting the fulfilling content to the requesting client device routed through the requesting content binding for use as content in the requesting content card instance.

* * * * *